June 18, 1940. G. STUDEBAKER 2,205,317
COOKY ICING MACHINE
Filed Jan. 12, 1938 3 Sheets-Sheet 1
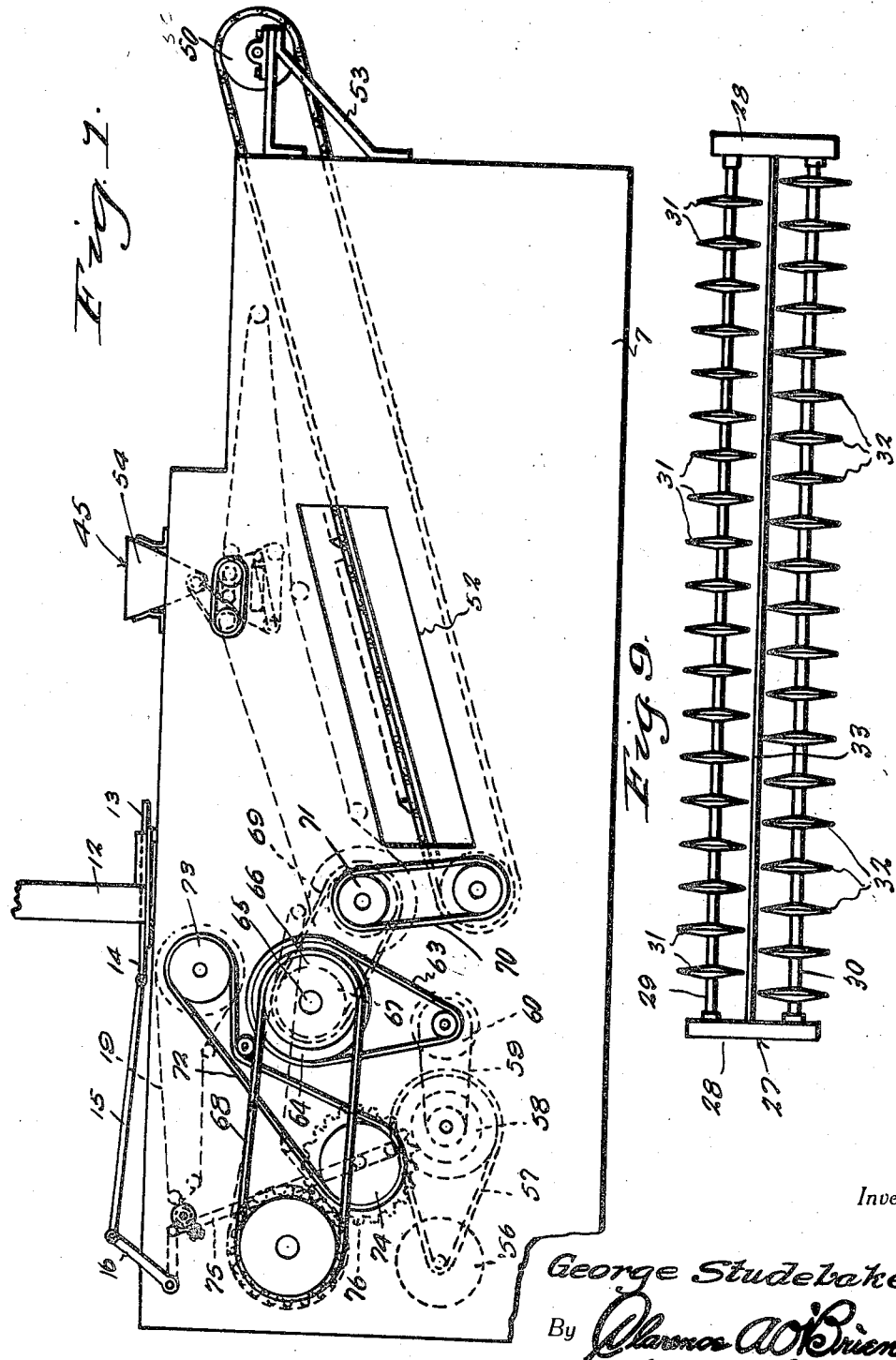
Inventor
George Studebaker
By Clarence A. O'Brien
Hyman Berman
Attorneys June 18, 1940.　　　G. STUDEBAKER　　　2,205,317
COOKY ICING MACHINE
Filed Jan. 12, 1938　　　3 Sheets-Sheet 2
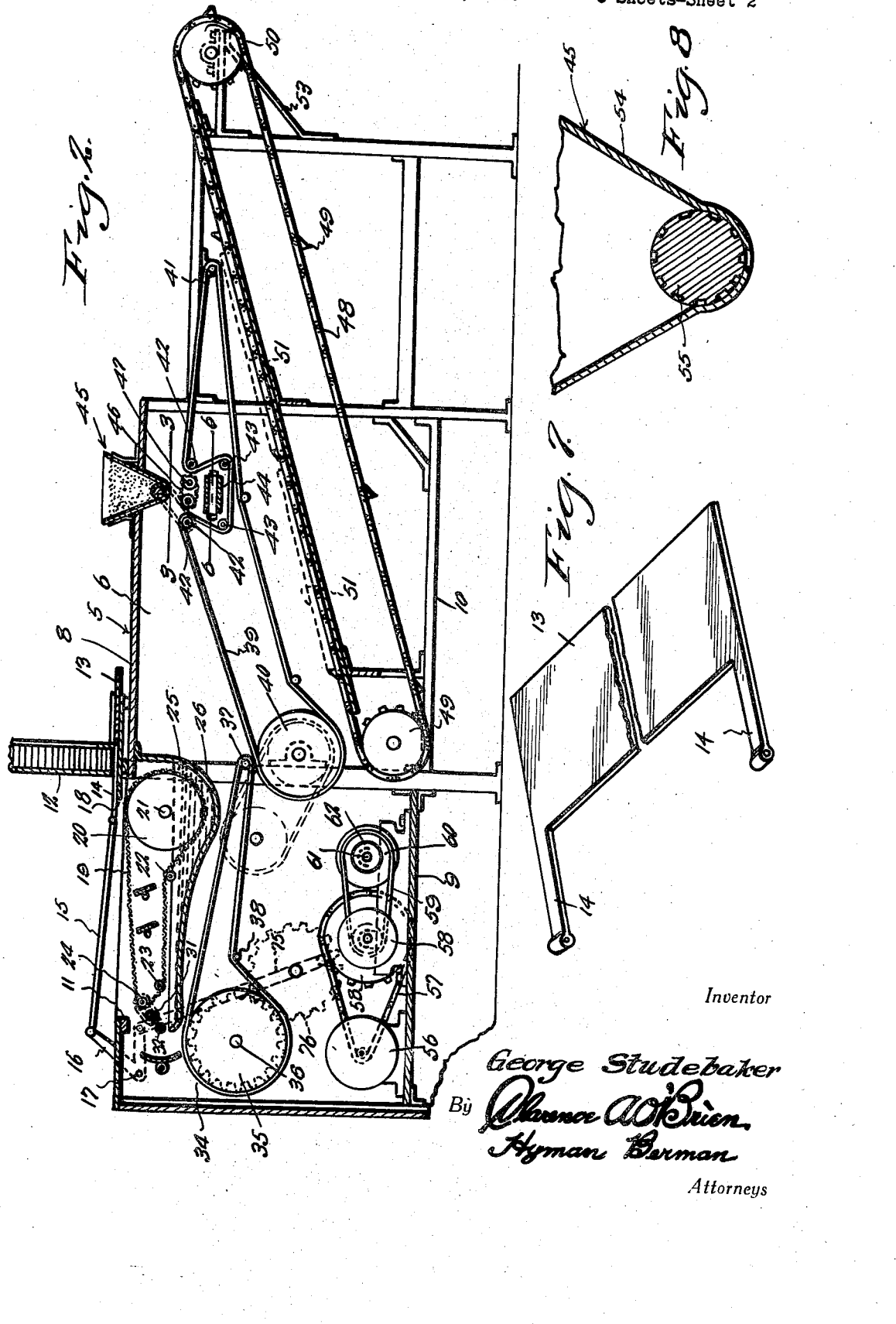
Inventor
George Studebaker
By Clarence A. O'Brien
Hyman Berman
Attorneys June 18, 1940.　　　G. STUDEBAKER　　　2,205,317
COOKY ICING MACHINE
Filed Jan. 12, 1938　　　3 Sheets-Sheet 3

Patented June 18, 1940

2,205,317

UNITED STATES PATENT OFFICE 2,205,317

COOKY ICING MACHINE

George Studebaker, Zion, Ill., assignor of one-half to Zion Industries, Inc., Zion, Ill., a corporation Application January 12, 1938, Serial No. 184,699

1 Claim. (Cl. 91—2)

This invention appertains to new and useful improvements in machines for icing cookies automatically.

An important object of the invention is to provide a machine in which cooked pastry can be placed and in which the machine will first mechanically dip the cookies, invert them so that they will have their top sides coated, subsequently sugarize the coating and then automatically arrange the same in movable trays.

Other important objects and advantages of the invention will become apparent to the reader of the following specification.

In the drawings:

Figure 1 represents a side elevational view of the machine.

Figure 2 is a longitudinal sectional view.

Figure 3 is a fragmentary sectional view on the line 3—3 of Figure 2.

Figure 4 is a fragmentary detailed sectional view of the cooky feed means.

Figure 5 is a fragmentary top plan view of the hopper and associated mechanism.

Figure 6 is a fragmentary sectional view on the line 6—6 of Figure 2.

Figure 7 is a perspective view of the hopper slide.

Figure 8 is a fragmentary vertical sectional view through the sugar dispenser.

Figure 9 is a plan view of the cooky turning mechanism.

Referring to the drawings wherein like numerals designate like parts, it can be seen that the machine includes the housing generally referred to by numeral 5 in which includes the side walls 6—7 and the top wall 8. The housing also includes the bottom wall 9 and the floor 10.

Adjacent one end of the machine and in the top 8 is the opening 11 adjacent one end of which is the vertically extending hopper 12. This hopper extends entirely across the top 8 and is partitioned off vertically to accommodate a plurality of vertical stacks of cookies.

Under the hopper 12 the slide plate 13 is movable, the slide plate 13 being provided with leg portions 14—14 connected by rods 15 to the bellcranks 16 on the shaft 17.

Cookies are movable from the hopper 12 by the slide plate 13 along the platform 18 from where they drop onto the endless mesh web 19. This web 19 is disposed over the drum 20 on the shaft 21 and also over and under the pulleys 22, 23 and 24.

The drum 20 serves to dip the web 19 into the coating material 25 located in the trough 26, which trough is located immediately under the opening 11.

Adjacent the roll 24 is located the cooky turning mechanism generally referred to by numeral 27 and which is clearly shown in Figure 9. This consists of the pair of end members 28—28 connected by the pair of shafts 29—30 on which are the multiplicity of rollers 31—32 for the shafts 29—30, respectively. A longitudinally extending member 33 extends between the rollers 31—32 as shown in Figure 9. Obviously, cookies after having been dipped on the web 19 are carried around and pass over the rollers 31 and tilt over on the longitudinal member 33 and pass onto the rollers 32 thus inverting themselves as they pass onto the web 34 which is trained over the drum 35 located on the shaft 36 and over the rollers 37—38. As will be seen the trough 26 extends well beyond the delivery end of the web 19 and the turning mechanism not only acts to turn the cookies but bridges the space between the delivery end of the web 19 and the adjacent end of the trough and this arrangement enables the coating material to drip from the cookies as they are being turned and drop into the trough so that surplus coating material is removed and none of this material drips upon the web or conveyor 34. From the web 34, the cookies pass on to the elongated web 39 which is trained over the drum 40 and also over the small distantly located roll 41. The intermediate portion of this web is trained over the small rolls 42—42 and downwardly from these rolls to pass under the rolls 43—43. This defines an offset in the web to accommodate the conveyor 44 which is disposed transversely of the machine for catching any surplus sugar falling from the dispenser generally referred to by numeral 45. A short web 46 disposed over rollers 47 substantially bridges the gap between the rollers 42—42 for carrying the cookies over this offset while they are being supplied with sugar from the dispenser 45.

Numeral 48 denotes a web preferably made up of a multiplicity of endless chain members and these are disposed over the drums 49—50. This web 48 carries a plurality of spurs 49 equally distantly arranged for bearing against flat trays 51 placed on the web through an opening or doorway 52 in the side wall 7.

The upper end of the web 48 is carried by the drum 50 supported by the bracket 53.

The dispenser 45 includes the hopper 54 having the rotatable and longitudinally grooved gauging member 55 mounted in the bottom thereof.

As shown in Figure 2, a motor 56 is mounted on the bottom wall 9 and a chain 57 from the motor to the sprocket wheel 58 drives the pulley 58 which in turn drives the belt 59 to the pulley 60 on the shaft 61 with the pulley 62. The pulley 62 drives the belt 63 which in turn drives the pulley 64 on the shaft 65 with the pulley 66 and also with the pulley 67 which drive the belts 68—69. The belt 69 drives the drum 35 while the belt 68 drives the shaft 65. The belt 70 from the pulley 71 drives the endless conveyor 48.

The belt 72 trained over the pulleys 73—74 serves to drive the web 19. An arm 75 eccentrically connected to the gear 76 is pivotally connected at its upper end to the bellcrank 16.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A cooky coating machine comprising a trough containing coating material, an endless conveyor, rollers for supporting the same, one of the rollers causing a portion of the conveyor to enter the coating material, a hopper, means for feeding the cookies from the hopper upon the upper reach of the conveyor, said trough having its rear end extending well beyond the delivery end of the conveyor and said delivery end of the conveyor being well above the trough, a pair of horizontal shafts spaced apart and arranged above said rear end of the trough, a plurality of small rollers on each shaft, one shaft being spaced from and arranged below the horizontal plane of the delivery end of the conveyor and the other shaft being arranged below the horizontal plane of said shaft with its rollers extending beyond the rear end of the trough, said small rollers conveying the cookies from the delivery end of the conveyor downwardly and rearwardly over the rear end of the trough, a bar located between the shafts and cooperating with the rollers for turning the cookies and a second conveyor passing under the trough and receiving the cookies from the small rollers.

GEORGE STUDEBAKER.